United States Patent [19]

Arita et al.

[11] 4,287,508
[45] Sep. 1, 1981

[54] INFORMATION TRANSMITTING AND RECEIVING APPARATUS

[75] Inventors: Setsuo Arita, Hitachi; Takao Sato, Tokaimura, both of Japan

[73] Assignee: Hitachi, Ltd., Tokyo, Japan

[21] Appl. No.: 74,146

[22] Filed: Sep. 10, 1979

[30] Foreign Application Priority Data

Sep. 8, 1978 [JP] Japan .................................. 53-109748

[51] Int. Cl.³ ............................................ H04Q 9/00
[52] U.S. Cl. ..................................... 340/150; 340/518
[58] Field of Search ................. 340/147 SY, 150, 518, 340/167 R, 164 R, 522, 523, 147 C; 371/67, 69

[56] References Cited

U.S. PATENT DOCUMENTS

| 3,735,353 | 5/1973 | Donovan et al. ............... 340/164 R |
| 3,772,649 | 11/1973 | Haselwood et al. ................... 371/69 |
| 3,858,181 | 12/1974 | Goldsby et al. ..................... 340/150 |
| 4,001,785 | 1/1977 | Miyazaki et al. .................... 340/518 |

Primary Examiner—Donald J. Yusko
Attorney, Agent, or Firm—Craig and Antonelli

[57] ABSTRACT

Disclosed is an information transmitting and receiving apparatus comprising a transmitting means for sequentially transmitting a plurality of information signals each including a synchronizing signal, an address signal and a data. The information transmitting and receiving apparatus further comprises a receiving means which sequentially receives the transmitted information signals and compares a current data signal of a certain address with the previously received data signal of the same address, and, if both the data signals do not coincide with each other, demands the transmitting means to transmit again the current data signal in sequence irrespective of the order of storing the aforesaid information signals thereby achieving the transmission of the data to be again transmitted.

12 Claims, 7 Drawing Figures

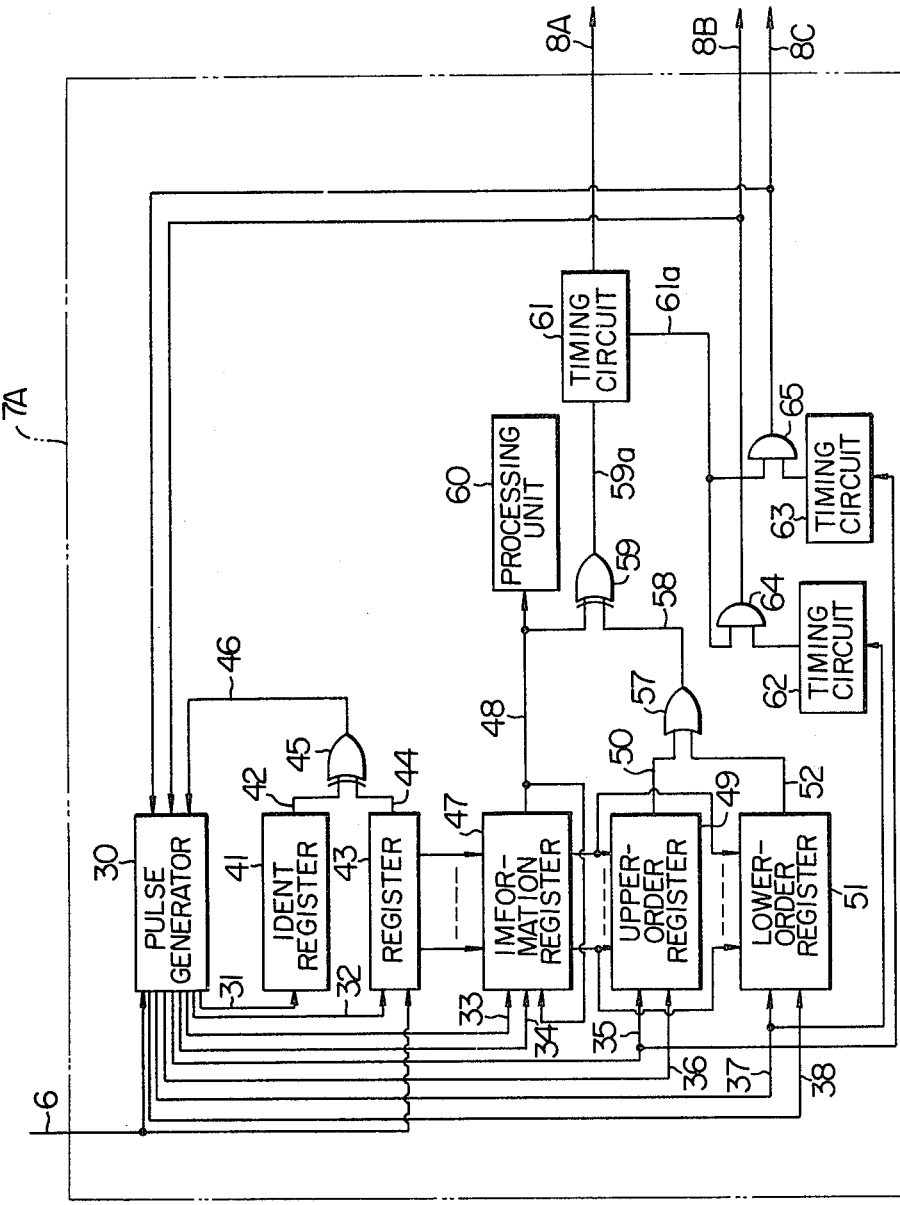

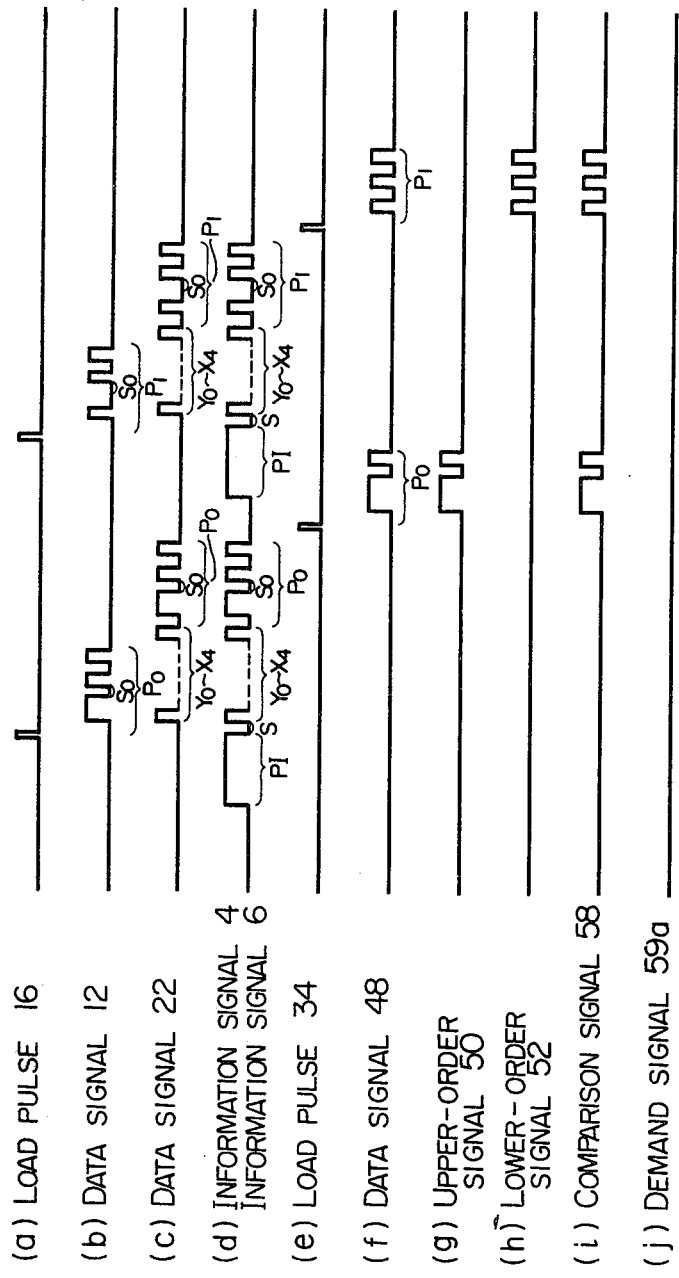

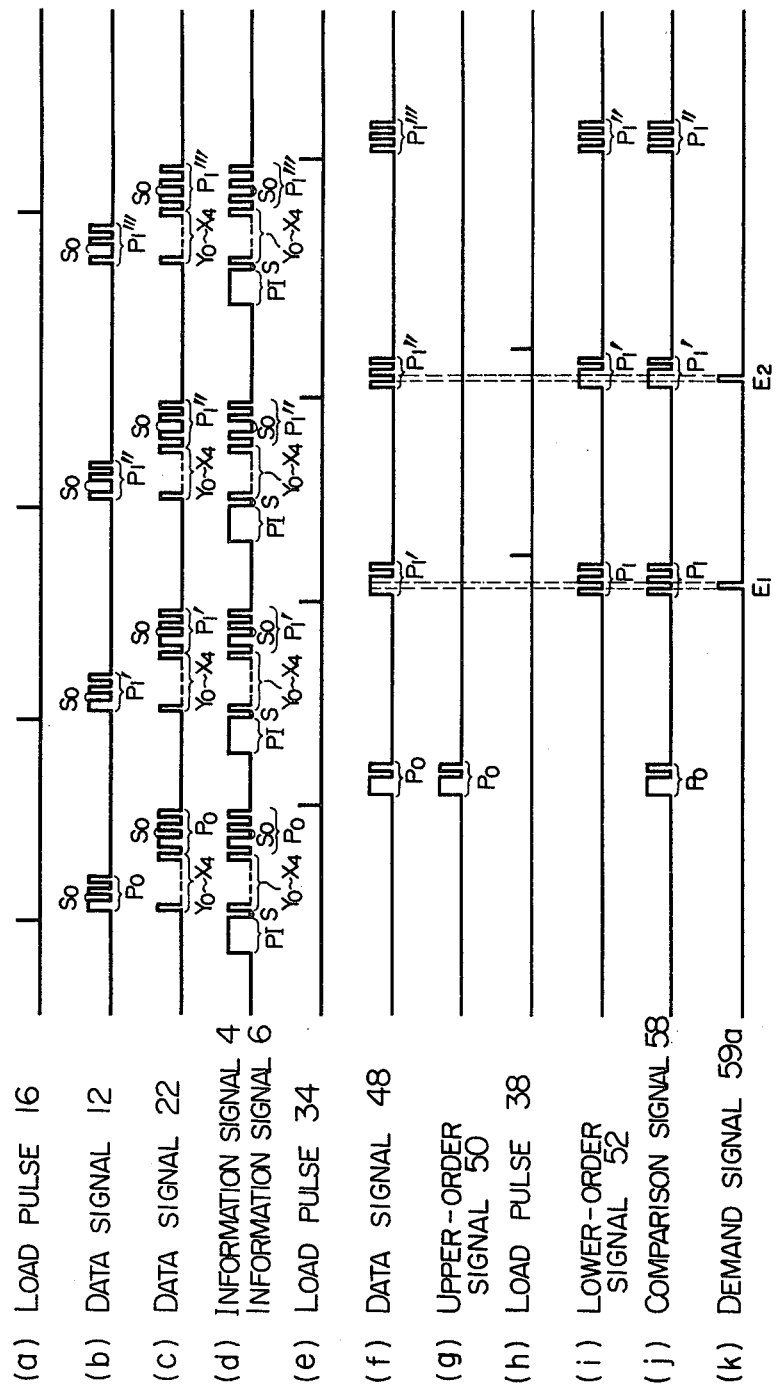

INFORMATION TRANSMITTING AND RECEIVING APPARATUS

BACKGROUND OF THE INVENTION

The present invention relates to transmitting and receiving apparatus, and particularly to a transmitting and receiving apparatus for a serial information signal to be transmitted between asynchronous control systems.

When the output signals from multiple detectors formed of asynchronous control systems are transmitted to a receiving apparatus located at a remote place, a coded-signal series transmission system, or the so-called data-way system is employed for the purpose of reducing cable laying cost. For example, the serial information signal is transmitted in the form of serial data of a constant length including a synchronizing signal unit, an address signal unit and a data signal unit. In general, error checking of the serial information signal is performed by providing a check bit, a special code or a serial transfer check. These, however, increase redundancy and thus make the processing speed slow, so that rapid change of information is sometimes difficult to be reliably transmitted.

SUMMARY OF THE INVENTION

The object of the present invention is to provide a data transmitting and receiving apparatus in which data, when not changing, is transmitted positively at a constant speed and when data changes, the rate of transmission per unit time is automatically increased, thereby increasing the apparent transmission of information.

The feature of the present invention is to automatically change the transmission speed in accordance with the rate of change of data.

Other objects, features and advantages of this invention will become apparent from the following description taken in conjunction with the accompanying drawings.

BRIEF DESCRIPTION OF THE DRAWINGS

FIG. 4 is a block diagram of one example of the receiver in FIG. 1.

FIGS. 5 and 6 are each a timing chart to which reference is made in explaining the operation of the transmitter and receiver.

DETAILED DESCRIPTION OF THE PREFERRED EMBODIMENT

An embodiment of the invention will hereinafter be described in detail.

Figure 1:
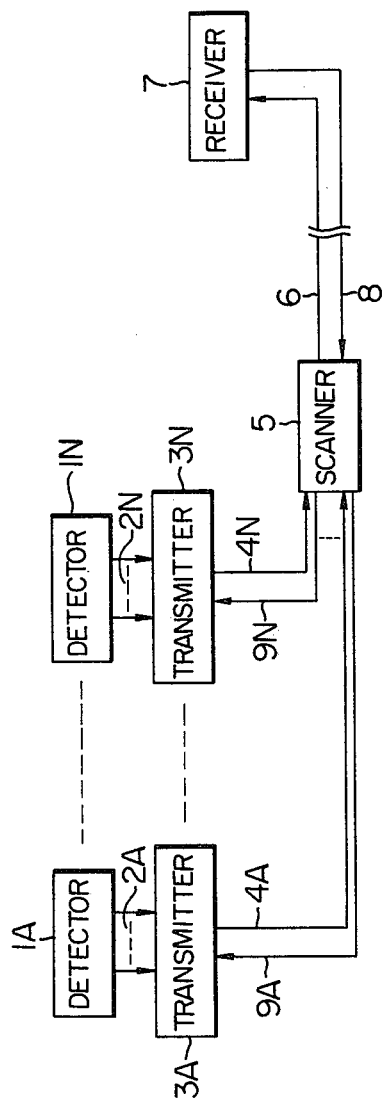
FIG. 1 shows a general arrangement of the present invention.
Figure 2:
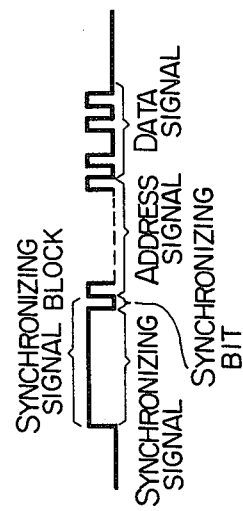
FIG. 2 shows the form of information used in the invention.

Referring to FIG. 1, there are shown a plurality of detectors 1 (1A, . . . 1N), which supply data signals 2 (2A, . . . , 2N) to transmitter circuits 3(3A, . . . , 3N). Each transmitter circuit 3(3A, . . . , 3N) converts an address signal and a data signal of the corresponding detector into a serial information signal 4(4A, . . . , 4N) of a constant length as shown in FIG. 2 and supplies it to a scanner 5. Each of these serial information signals includes a synchronizing signal block having a synchronizing signal and a synchronizing bit, an address signal and a data signal. The scanner 5 transmits each serial information signal to a receiver circuit 7 in a time-sharing manner. The receiver circuit 7 compares an incoming information signal 6 with the previously received one for the purpose of checking whether the two signals are equivalent or not, and if not, the receiver circuit 7 supplies a demand signal 8 to the scanner 5 which then transmits demand signals 9(9A, . . . , 9N) to the transmitter circuits 3(3A, . . . , 3N). This demand signal 8 demands the transmitter circuits 3(3A, . . . , 3N) to again transmit an information signal equivalent to the previously received one until the incoming signal coincides with the previous one.

Figure 3:
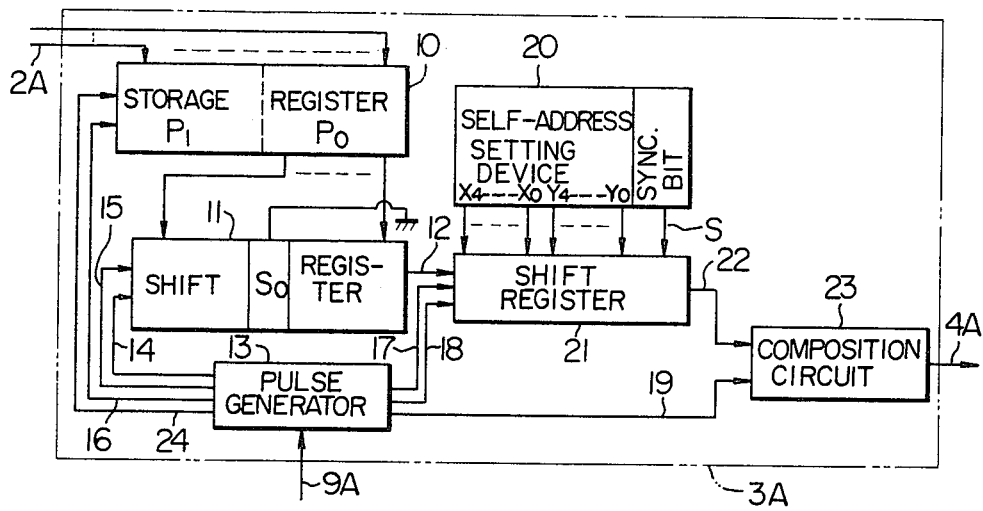
FIG. 3 is a block diagram of one example of the transmitter in FIG. 1.

A method of transmitting and receiving information signals, and apparatus therefor which are a main part of the present invention, will next be described in detail with reference to FIGS. 3, 4, 5 and 6. FIG. 3 shows one embodiment of the transmitter circuit 3, and FIG. 4 one embodiment of the receiver circuit 7. First, the operation of the transmitter circuit 3 and receiver circuit 7 in the case where the information signal 6 to the receiver circuit 7 is equivalent to the previously received one will be described with reference to FIG. 5.

In the transmitter circuit 3 (3A) of FIG. 3, a data signal 2 (2A) produced from the detector 1 (1A) is applied to a storage register 10 in which the data signal 2 (2A) is stored by the application of a load pulse 16 from a pulse generator circuit 13 to the storage register 10.

The storage register 10 supplies, for example, upper-order bits Po of the received data signal 2 (2A) to a shift register 11 in which the upper-order bits Po are stored by the application of a load pulse 14 as shown by FIG. 5(a).

Although a signal for synchronizing between asynchronous apparatus (the synchronizing signal block shown in FIG. 2) is formed on the basis of a fixed logic of constant length, all the bits thereof are "1" or "0". Thus, when all the bits of the data signal shown in FIG. 2 are "1" or "0", the discrimination between both the synchronizing signal block and data signal can not be performed. To avoid this, a space bit is inserted into the data signal for discrimination from the synchronizing signal block.

Therefore, while the upper-order bits Po are n bits, the shift register 11 contains (n+1) bits including the space bit. In this case, the space bit is located at a predetermined position in the shift register 11. If the upper-order bits Po of the data signal stored in the storage register 10 is "11111111", the data to be stored in the shift register 11 is "111101111", which can thus be discriminated from the synchronizing signal. The shift register 11, when supplied with a shift pulse 15, transfers the stored data signal to a shift register 21 in the form of a data signal 12 of (n+1) bits as shown by FIG. 5(b), where So represents the space bit. Into the shift register 21 are also entered from a self-address setting device 20 a synchronizing bit S and an address signal (Y₀ to X₄) inherent to the corresponding detector by timely application of a load pulse 18 to the shift register 21. Then, the signals entered from the self-address setting device 20 and the signal 12 transferred from the shift register 11 are sequentially supplied from the shift register 21 to a composition circuit 23 as shown in FIG. 5(c) each time a shift pulse is applied to the shift register 21. The composition circuit 23 serves to combine the data signal 22 transferred from the shift register 21 with a synchronizing signal 19 produced from the pulse generator circuit 13 so as to produce the serial information signal 4 including the data signal Po as shown in FIG. 5(d), which is then transmitted to the scanner 5 in FIG. 1. The scanner 5, which is like a selection switch, selects the information signal 4 and transmits it to the receiver circuit 7 as an information signal 6.

The receiver circuit 7 (7A) as shown in FIG. 4 acts to process the incoming information signal 6 therein as described below. In this case, the receiver circuit 7 generally includes multiple receiver circuits 7A to 7N the number of which corresponds to that of the detectors 1A to 1N used, the receiver circuit 7A being shown as an example in FIG. 4.

Referring to FIG. 4, the information signal 6 is entered in a register 43 by the application of a shift pulse 32 thereto from a pulse generator circuit 30. The address part of the signal received by the register 43 is applied to an exclusive OR (EOR) gate 45 as an address signal 44 by the application of the shift pulse 32. At the same time, an ident register 41 having the self-address of the receiver circuit 7 (7A) supplies an address signal 42 to the EOR gate 45 by the application of a shift pulse 31. The EOR gate 45 compares both the input signals 42 and 44. If both the address signals are not equivalent, the EOR gate 45 supplies an anticoincidence signal 46 to the pulse generator circuit 30, thereby causing the receiver circuit 7A to reject the information signal 6. At this time, this information signal 6 will be received by another receiver circuit. If both the address signals are equal, the signal stored in the register 43 is entered in an information register 47 by the application of a load pulse 34 as shown in FIG. 5(e). The information register 47, when supplied with a shift pulse 33, supplies the stored signal to a processing circuit 60 and an EOR gate 59 as a data signal 48 shown in FIG. 5(f). At the same time, an upper-order register 49 supplies the preceding signal which was stored by the application of a shift pulse 35, to an OR gate 57 as an upper-order signal 50 as shown in FIG. 5(g). The OR gate 57 supplies the upper-order signal 50 to the EOR gate 59 as a comparison signal 58 as shown by FIG. 5(i). The EOR gate 59 compares the data signal 48 with the comparison signal 58. If both the data signals are equal, the EOR gate 59 does not produce the demand signal 59a as shown in FIG. 5(j). If both data signals are unequal, the information signal is demanded to be sent again and the above-mentioned operations are repeated until the currently received information signal coincides with the previously received one, as will be described in detail later.

Thus, the Po-bit part of the data signal 12 which is separated as, for example, shown by FIG. 5(b) is entered in the processing circuit 60.

In the case of the $P_1$-bit part of the data signal 12 which is separated as shown in FIG. 5(b), the $P_1$-bit signal is entered in the information register 47 and the signal therefrom is applied to the processing circuit 60 and the EOR gate 59. This process of operation is similar to the case where the $P_0$-bit part of the data signal 12 in FIG. 5(b) is transmitted as described above, and hence only the different aspect of the operation will be mentioned below.

A lower-order register 51, when supplied with a shift pulse 37, sends out the previously received signal to the OR gate 57 as a lower-order signal 52 as shown in FIG. 5(h). The OR gate 57 supplies the lower-order signal 52 to the EOR gate 59 as a comparison signal 58 as shown in FIG. 5(i). The EOR gate 59 compares the data signal 48 with the comparison signal 58. If both the signals are coincident with each other, the EOR gate 59 fails to produce the demand signal 59a as shown by FIG. 5(j). Then, the processing circuit 60 operates to process the bits $P_0$ and $P_1$ of the signal produced from the information register 47.

As described above, the separately transmitted data $P_0$ and $P_1$ are processed as a sequence of information in the receiving circuit 7 (7A).

Description will next be made of the case where the data signal $P_1$ is dissimilar to the previously received one as, for example, illustrated in FIG. 6(b) in connection with FIGS. 3, 4 and 6.

Referring to FIG. 3, if the $P_1$-bit part of the data signal 2 is stored in the shift register 11 as a data different from the preceding one a different bit $P'_1$ of the data signal 12 as shown in FIG. 6(b) is supplied to the information register 47 as shown in FIG. 4, which operation is similar to the operation described above. The information register 47, when supplied with the shift pulse 33, supplies the data signal 48 of the bit $P'_1$ as shown by FIG. 6(f) to the EOR gate 59 and the processing circuit 60. In the same way, the lower-order register 51, when supplied with the shift pulse 37, supplies the lower-order signal 52 of the bit $P_1$ as shown by FIG. 6(i) through the OR gate 57 to the EOR gate as the comparison signal 58 as shown by FIG. 6(j). The EOR gate 59, if both input signals are not coincident with each other, produces a demand signal 59a like a pulse $E_1$ of FIG. 6(k) and supplies it to a timing circuit 61.

The timing circuit 61 generates outputs 61a and 8A in response to the demand signal 59a supplied thereto (of course, the signal 59a can be directly produced from the timing circuit 61). The output 61a is applied to an upper-order indicating AND gate 65 and a lower-order indicating AND gate 64. Timing circuits 62 and 63, when supplied with the shift pulses 37 and 35, produce lower- and upper-order indicating signals, respectively. Thus, the AND gates 64 and 65 produce lower- and upper-order indicating signals 8B and 8C at the time of anticoincidence of data, respectively. The output 8A is fed as a resending demand signal. The resending demand signal 8A, lower-order indicating signal 8B and upper-order indicating signal 8C constitute a resending signal 8 upon anticoincidence of data.

Figure 7:
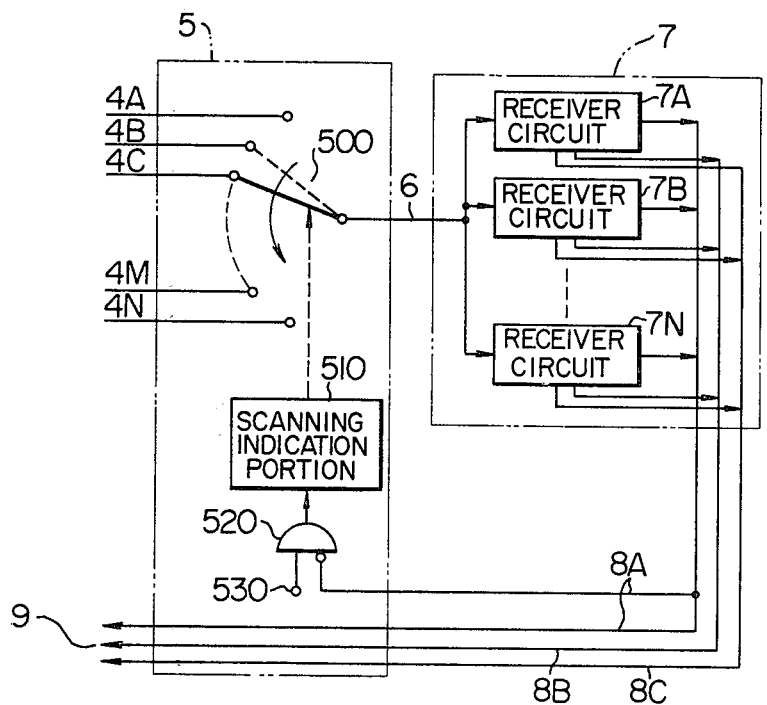
FIG. 7 shows one example of the scanner in FIG. 1.

FIG. 7 shows an embodiment of the scanner 5 for processing the resending signal 8. The scanner 5 is composed of a scanning portion 500, a scanning indication portion 510 and a gate 520. In the absence of the resending demand signal 8A, a scanning clock 530 is applied through the gate 520 to the scanning indication portion 510, which then causes the scanning portion 500 to operate in a scanning mode. When the resending demand signal 8A comes in, the gate 520 is disabled by that signal, and thus the scanning portion 500 stops at the number of the transmitter where anticoincidence has occurred. Consequently, the scanning portion 500 waits for the information about which anticoincidence occurred. On the other hand, the other lower- and upper-indicating signals 8B and 8C of the resending demand signal 8 are fed to the transmitter and receiver circuits 3 and 7 together with the signal 8A and control the signal from the corresponding detector to be transmitted and received. The processing circuit 60 continues to store the bits $P_0$ and $P'_1$ shown in FIG. 6(f) until the next data signal 48 comes. The lower-order register 51, after sending out the lower-order signal 52, stores the content $P'_1$ of the information register 47 by timely application of a load pulse 38 as shown by FIG. 6(*h*).

In FIG. 3, when the pulse generator circuit 13 is supplied with a demand signal 59A (9A), as shown by the pulse $E_1$ in FIG. 6(*k*), from the scanner 5 to which the demand signal 8 is applied from the receiver circuit 7A of FIG. 4, the pulse generator circuit 13 outputs the load pulse 16 as shown in FIG. 6(*a*) so as to cause bits $P''_1$ to be applied from the storage register 10 to the shift register 11. The shift register 11 sends out the data signal 12 of bits $P''_1$ of FIG. 6(*b*) which was stored therein as described above, and then the information signal 4 is formed in the same way as that described above and applied through the scanner 5 to the receiver circuit 7A.

In FIG. 4, the bits $P''_1$ of the information signal 6 are applied to the information register 47 which, when supplied with the load pulse 34, stores the bits $P''_1$. The information register 47, when supplied with the shift pulse 33, sends out the data signal 48 of bits $P''_1$ shown by FIG. 6(*f*) to the EOR gate 59 and the processing circuit 60. At this time, the lower-order register 51 supplies to the OR gate 57 the lower-order signal 52 shown by FIG. 6(*i*) which was previously stored by the application of the shift pulse 37, and the OR gate 57 applies to the EOR gate 59 the comparison signal 58 shown by FIG. 6(*j*). The EOR gate 59 outputs the demand signal 59a shown by the pulse $E_2$ in FIG. 6(*k*) because both the input signals are not coincident with each other, and supplies it to the transmitter 3 through the scanner 5 in FIG. 1 as described above. The processing circuit 60 stores the data signal 48 of bits $P_0$ and $P''_1$ shown in FIG. 6(*f*). On the other hand, the lower-order register 51, after producing the lower-order signal 52, stores the contents $P''_1$ of the information register 47 by the application of a load pulse 38 as shown by FIG. 6(*h*).

When the transmitter circuit 3 of FIG. 1 is supplied with a resending signal based on the demand signal 59a like the pulse $E_2$ shown by FIG. 6(*k*), the transmitter circuit 3 sends out the information signal 4 including a signal $P'''_1$ as shown by FIG. 6(*d*) through the scanner 5 in FIG. 1 to the receiver circuit 7 (7A). In the receiver circuit 7 (7A), the data signal 48 of bit $P'''_1$ shown by FIG. 6(*f*), which has been stored in the information register 47, is transferred to the EOR gate 59 and the processing circuit 60. Simultaneously, the lower-order register 51 supplies the lower-order signal 52 of bits $P''_1$ shown by FIG. 6(*i*) which was received previously, through the OR gate 57 to the EOR gate 59. The EOR gate 59 compares both input signals, and if they are coincident with each other, the EOR gate 59 does not output the demand signal 8. The processing circuit 60 stores this just received bit $P'''_1$ together with the signal $P_0$ which was stored previously. Then, normal operation follows.

Even though data changes randomly as mentioned above, resending of data enables stored data to be accurate.

The above description has been made of the case where the information signal of data is different from the previously received one. There are two kinds of data change, one of which is that error is undesirably mixed into data and the other of which is that data changes state of itself whether one likes or not. The present invention is applicable to both cases. Description will now be made of the latter case, or the case where the output of the detector varies to change the information signal.

When the output of a certain detector now changes, the information signal resulting from scanning the corresponding data signal becomes different from, for example, a lower-order signal stored in the lower-order register 51 in FIG. 4. Consequently, the demand signal 59a is produced from the EOR gate 59 and thus the information signal is again transmitted. On the other hand, the lower-order register 51 stores the content of the information register 47 after outputting the lower-order signal 52. Since the information signal to be transmitted again and the currently received signal in the lower-order register 51 are not coincident with each other, the EOR gate produces the demand signal 59a. The repetition of the above operation is completed when the currently received information signal coincides with the last stored one in the lower-order register 51, that is, when the detector output stops changing.

The apparatus of the invention is arranged so that as described previously the time required for transmitting data is changed to automatically follow the rate of change of the data to be transmitted. In this case, it is better to use the word "follow demand" rather than "resending demand".

Moreover, since any error in the information signal can be checked without providing a redundant bit such as the parity check, the apparatus of the invention is very well suited for the high-reliability transmission of signals.

In accordance with the present invention, an information signal is divided into a plurality of parts, which are separately transmitted, and during change of the information signal, continuous retransmission of the signal is performed automatically, so that the apparent transmission time is reduced, or, in other words, the transmission capacity is increased. Therefore, the apparatus of the invention is greatly useful for data transmitting and receiving apparatus which transmits and receives data at a high speed and with high reliability. The present invention is most suitable for the system which has a plurality of objects to be asynchronously controlled, these objects to be controlled being changed in state, for example, by an external control command. In this case, all the objects to be controlled do not change at the same time or at the same rate; with lapse of time, particular ones slowly change and other particular ones may change relatively rapidly. In such a case, the object system to be controlled which is changed relatively fast can not correctly be followed by the receiver when all the objects are scanned. According to the invention, the object system to be controlled can be surely followed, for example, monitored because even during scanning of all objects, data in the object system to be controlled, which is changed in position, encounters anticoincidence, and instantly a resending demand signal is transmitted. Moreover, in one control system there may occur a small amount of change, in which case when the whole range of change is made maximum, a small change occurs at each time point. In other words, if data is divided into, for example, two parts, the upper value is not changed but only the lower value is changed. The present invention is extremely effective for such a case. Although the data division is quite effective, it is not necessarily required.

The present invention thus enables data to be transmitted and received with high reliability.

It will be apparent that many modifications and variations may be effected without departing from the scope of the novel concepts of this invention.

I claim:

1. An information receiving apparatus for receiving information in the form of sets of sequentially-transmitted information signals, each information signal including synchronizing signal, address signal and data signal portions and representing a segment of an information set, comprising first means for storing the data signal portion of a currently-received information signal;

second means for separately storing the data signal portions of the previously-received information signals of the immediately-preceding information set;

third means connected to said first means for comparing the data signal portion stored in said first means with a data signal portion stored in said second means;

fourth means responsive to the synchronizing signal portions of said received information signals for reading out to said third means the stored data signal portion in said second means which corresponds to the same segment within an information set as the data signal portion stored in said first means; and fifth means responsive to said third means for providing a retransmission command signal when lack of comparison between data signal portions is detected by said third means.

2. An information receiving apparatus as defined in claim 1, further including sixth means responsive to said fourth and fifth means for providing a segment indicating signal identifying the segment in the information set to which the currently-received information signal relates.

3. An information receiving apparatus as defined in claim 2, wherein said first means comprises an input register for storing the address signal portion of an information signal, comparing means for comparing the contents of said input register to a predetermined address and information register means for storing the data signal portion of said information signal when coincidence is detected by said comparing means.

4. An information receiving apparatus as defined in claim 2, wherein said second means comprises a plurality of registers for storing the data signal portion of the respective segments of an information set, said fourth means including enabling means for enabling said registers in turn to read out their contents to said third means as successive information signals are received.

5. An information receiving apparatus as defined in claim 4, wherein said fourth means further includes control means responsive to a segment indicating signal from said sixth means for controlling said enabling means to repeat the read-out from the previously-enabled register in said second means.

6. An information transmitting and receiving apparatus comprising transmitting means for transmitting information in the form of sets of sequential information signals, each information signal including synchronizing signal, address signal and data signal portions and representing a segment of an information set; and receiving means for receiving transmitted information signals including first means for storing the data signal portion of a currently-received information signal; second means for separately storing the data signal portions of the previously-received information signals of the immediately-preceding information set; third means connected to said first means for comparing the data signal portion stored in said first means with a data signal portion stored in said second means; fourth means responsive to the synchronizing signal portions of said received information signals for reading out to said third means the stored data signal portion in said second means which corresponds to the same segment within an information set as the data signal portion stored in said first means; and fifth means responsive to said third means for providing a retransmission command signal when lack of comparison between data signal portions is detected by said third means.

7. An apparatus as defined in claim 6, wherein said transmitting means includes storage register means for storing the data signal portions which make up an information set, composition circuit means for sequentially composing information signals including said synchronizing signal address signal and data signal portions, and means for sequentially transferring data signal portions from said storage register means to said composition circuit means.

8. An apparatus as defined in claim 7, further including sixth means responsive to said fourth and fifth means for providing a segment indicating signal identifying the segment in the information set to which the currently-received information signal relates.

9. An apparatus as defined in claim 8, wherein said transferring means in said transmitting means includes means responsive to a retransmission command signal and a segment indicating signal for effecting retransfer of a data signal portion identified by said segment indicating signal to said composition circuit means.

10. An apparatus as defined in claim 9, wherein said first means comprises an input register for storing the address signal portion of an information signal, comparing means for comparing the contents of said input register to a predetermined address and information register means for storing the data signal portion of said information signal when coincidence is detected by said comparing means.

11. A method for information transmitting and receiving in a system including at least one transmitter and a plurality of receivers comprising:

sequentially transmitting a plurality of information signals each including a synchronizing signal, an address signal and a data signal;

sequentially receiving said transmitted information signals in each of said receivers;

comparing the data bits of a currently-received information signal including a certain address associated with the receiver with the data bits of a previously-received information signal including the same address; and if both sets of data bits are not coincident with each other, initiating retransmission of the information signal including the same address irrespective of the order of receipt of said information signals, thereby causing the information signal to be transmitted again by said transmitting means until data coincidence occurs at the receiver.

12. The method according to claim 11, wherein a data signal to be transmitted is divided into a plurality of parts in accordance with a transmitting bit sequence order and wherein each part of the data signal is included in a separate information signal, said comparing step including comparing the divided part in the current input information signal with the previously-received corresponding divided part and, if no coincidence is detected with the data of one of the divided parts, initiating retransmission of the information signal relating only to the divided part corresponding to that detected current divided part.

* * * * *